(12) United States Patent
Lion et al.

(10) Patent No.: US 7,075,442 B2
(45) Date of Patent: Jul. 11, 2006

(54) FOOD TEMPERATURE MONITORING DEVICE

(75) Inventors: Mathieu Lion, Paris (FR); Janick Simeray, Argenteuil (FR)

(73) Assignee: Mastrad SA, Paris (FR)

( * ) Notice: Subject to any disclaimer, the term of this patent is extended or adjusted under 35 U.S.C. 154(b) by 111 days.

(21) Appl. No.: 10/615,313

(22) Filed: Jul. 7, 2003

(65) Prior Publication Data

US 2005/0012627 A1     Jan. 20, 2005

(51) Int. Cl.
G08B 17/00 (2006.01)

(52) U.S. Cl. ............... 340/584; 340/540; 374/208; 99/421 TP

(58) Field of Classification Search ........... 340/343, 340/500, 539.1, 540, 584; 373/100, 376; 374/208; 99/421 TP
See application file for complete search history.

(56) References Cited

U.S. PATENT DOCUMENTS

| 3,582,921 | A | | 6/1971 | Krieger |
| 3,931,620 | A | | 1/1976 | Wellman |
| 4,297,557 | A | | 10/1981 | Tyler et al. |
| 4,309,585 | A | | 1/1982 | Doi |
| 4,377,733 | A | | 3/1983 | Yamaguchi |
| 4,475,024 | A | | 10/1984 | Tateda |
| 5,798,694 | A | * | 8/1998 | Reber et al. ............ 340/540 |
| 6,060,987 | A | * | 5/2000 | Marlia ................... 340/540 |
| 6,539,842 | B1 | * | 4/2003 | Chapman et al. ........ 99/342 |
| 6,546,846 | B1 | * | 4/2003 | Lin ....................... 99/342 |
| 6,617,971 | B1 | * | 9/2003 | Keller .................... 340/584 |
| 2003/0007544 | A1 | | 1/2003 | Chang et al. |

FOREIGN PATENT DOCUMENTS

| EP | 0687866 | 12/1995 |
| JP | 57-82628 | 5/1982 |
| WO | WO 90/11497 | 10/1990 |

* cited by examiner

Primary Examiner—Jeffery Hofsass
Assistant Examiner—George Bugg
(74) Attorney, Agent, or Firm—Blakely Sokoloff Taylor & Zafman

(57) ABSTRACT

Temperature monitoring device of a matter that is at least partly made of water, such as food, comprising a wireless temperature sensor comprising:
  a temperature transducer of the said matter;
  an electromagnetic wave transmitter circuit connected electrically with the temperature transducer, comprising a converter of electric signals transmitted from the transducer in the form of electromagnetic signals;
  a hermetic and good thermal conductive case designed to be fitted out with the electric system comprising the temperature transducer and the transmitter circuit;

wherein the sensor is laid out so that the temperature transducer is located near to the transmitter circuit, thereby forming a compact unit.

The invention further relates to a temperature monitoring process using the said temperature monitoring device.

24 Claims, 2 Drawing Sheets

FOOD TEMPERATURE MONITORING DEVICE

BACKGROUND OF THE INVENTION

1. Field of the Invention

This invention relates to a temperature monitoring device on the inside of matter that is at least partly of water, such as food, the device comprising a temperature sensor.

The invention further relates to an operating process for this device.

The invention relates, in particular, to the temperature monitoring of food, as much during cooking as when in a cold chain.

2. Description of the Related Act

Several of such devices are known of, these devices comprising:
- a sensor in contact with the food, capturing thermal data, and
- control means for controlling this thermal data, delivering at least some of the thermal data in a form likely to be understood by the user of the device.

The control means can be laid out so that the user is alerted of an excess in temperature by means of, for example, a light and/or sound warning set off when the sensor detects a temperature in excess of the pre-set temperature threshold, and/or the display of the detected temperature on a display support, such as a LCD screen.

The sensor in these devices comprises in particular:
- a food temperature transducer;
- connection means to connect with the control means;
- an interface circuit between the transducer and the connection means;
- an external case that protects the elements that it contains.

For some of these sensors, the said connection means is wired, such as, for example, those described in the documents U.S. Pat. No. 3,931,620, U.S. Pat. No. 4,309,585 and U.S. 2003 7544.

These wired connections are ergonomically restrictive for the user of such a device, and could notably bear encumbrance and safety problems.

Wireless temperature monitoring devices are thus preferable.

According to a first device configuration, the said sensor of the said control means are two distinct elements of the food temperature monitoring device, these two elements being connected together via a wireless electromagnetic connection, such as the sensors described in the documents U.S. Pat. No. 4,377,733 and U.S. Pat. No. 4,475,024.

These sensors are energised by external electromagnetic energy sources.

Furthermore these electromagnetic sources must be located near to the sensor so as to avoid too great a dissipation of the electromagnetic energy during its transmission.

And the volume taken up by these electromagnetic sources reduces the available space around the food, which could pose encumbrance problems if this space is restricted as in, for example, the case of the inside of ovens or freezers, whilst making the device all the more complex through the addition of another element.

Hence the documents JP 57-082628 and U.S. Pat. No. 3,582,921 propose wireless sensors using electromagnetic transmission, operating either autonomously or semi-autonomously.

According to the first of these documents, a rechargeable battery is placed in the sensor.

According to the second document, a Nickel-Cadmium electric cell is provided in the sensor.

According to a second configuration of a food temperature monitoring device, the sensor and the control means are interdependent and thus form a unique element, such as described, for example, in the document WO 90/11497.

This temperature monitoring device is autonomous as it operates via an electric cell.

Once the thermal data has been sent by the sensor, the control means sets off a light indicator which informs the user of an excess in temperature at the centre of the food.

However, this display medium offers restrictions relative to visualisation, notably when the food is placed in an enclosed area without windows or even an opaque window, such as in some ovens or cold rooms, as visualisation then requires an opening of the enclosed area which could provoke technical problems (contamination, sudden changes in temperature, etc.).

Generally speaking, each of the sensors presented in the aforementioned documents has a long tapered part comprising at its end a temperature transducer, and a case part distant from the transducer for the protection of the electric circuit and of any eventual battery found therein.

The long tapered part enables the penetration of the transducer which it comprises into the food in order to capture the temperature, preferably at the centre, whilst preventing the electrical parts contained in the case from coming into contact with the food, as the latter could contaminate it, as well as bringing heat or cold likely to disturb its proper functioning.

However, the said temperature monitoring devices are designed to operate in microwave ovens (in which the heat is mainly around the piece of food), in moderately hot environments, at room temperature or in moderately cold environments.

Indeed, the electrical parts needed to operate the transducers of these devices are not designed to resist high temperatures such as those attainable in convection or radiant ovens (200° C. to 300° C.), nor, for some, at very low temperatures such as those attainable in freezers (between −30° C. and −40° C.).

BRIEF SUMMARY OF THE INVENTION

This invention aims at improving the situation by proposing, according to an initial aspect, a temperature monitoring device for matter that is made at least partly of water, such as food, comprising a wireless temperature sensor comprising:
- a temperature transducer of the said matter;
- an electromagnetic wave transmitter circuit electrically connected to the temperature transducer, comprising a converter of electric signals coming from the transducer to electromagnetic-type signals;
- a hermetic and highly thermal conductive case, designed to be fitted with the entire electrical system comprising the temperature transducer and the transmitter circuit;
- wherein that the sensor is laid out so that the temperature transducer is near to the transmitter circuit, thereby forming a compact unit.

Other preferential characteristics of the temperature monitoring device according to the invention are:
- the sensor further comprises an electrical power supply for the entire sensor operating autonomously, such as an electric cell or rechargeable battery, installed in the case;

the power supply is near to the transducer and the transmitter circuit, thereby forming a compact unit;

the power supply is distant from the transmitter and the transducer so that it does not come into contact with the food when the sensor is inserted into the latter;

the power supply is protected from heat by a cover of thermal insulating material, thereby creating a thermal shield;

the cover is made of silicone;

the autonomous power supply of the sensor can operate up to a temperature of approximately 130° C. (266° F.);

the autonomous power supply of the sensor can operate from a temperature of approximately −40° C. (−40° F.);

the autonomous power supply of the sensor is a non saline and non alkaline electric cell;

the autonomous power supply of the sensor is a thionyl lithium electric cell;

the case is electrically conductive and the sensor further comprises an electric power switch-off means if the sensor in not in contact with the said matter, the power switch-off means being sensitive to the conductivity of the said matter;

the transmitter circuit transmits electromagnetic waves by bursts;

the hermetic case is made of a single piece;

the case is composed of several fitted parts that can be disassembled;

assembly means of two parts of the hermetic case are metallic and create an electric contact to operate the sensor;

the case is laid out so as to facilitate the inserting of the sensor into the said matter;

the sensor further comprises an electromagnetic wave transmitting aerial laid out so as to further compose a means of gripping;

the aerial is covered with an electrical insulating material;

the aerial is covered with silicone foam;

the device further comprises a control unit to control the thermal data transmitted by the sensor via electromagnetic way, this control unit comprising:

a receiver for the type of electromagnetic waves transmitted by the sensor;

a micro-controller capable of controlling the thermal data in electromagnetic form received from the sensor by the receiver, and of transmitting at least a part of it to a user interface;

the user interface comprising transmission means of the thermal data in a form understandable to the user of the device.

The control unit further comprises a memory capable of storing thermal data, and the micro-controller is capable of processing the thermal data received from the sensor in accordance with this thermal data;

the user interface comprises an alarm, the thermal data stored in the memory corresponds to a temperature threshold, and the micro-controller triggers the alarm if the temperature detected by the sensor is greater than the temperature threshold;

the user interface comprises means that allow the user to enter data into the memory;

the interface means comprises an alarm, and the micro-controller triggers the alarm if it does not receive any electromagnetic waves over a pre-set duration of time or if it does not receive one or several thermal data informations it should have received.

According to a second aspect, the invention proposes a temperature monitoring process for a matter that is at least partly of water, such as food, the matter having a temperature less than approximately 130° C. (226° F.), activating the temperature monitoring device according to one of the previous claims, wherein the wireless part of the temperature sensor comprising the transducer and the transmitter circuit is inserted into the said matter.

A specific characteristic of this process is that the part of the sensor that comprises the power supply is also inserted into the said matter.

BRIEF DESCRIPTION OF THE DRAWINGS

Other aspects, aims and advantages of this invention will be made clearer through the reading of the following detailed description of the device and process according to the invention, given as non-restrictive examples and made in reference to the annexed drawings in which.

DETAILED DESCRIPTION OF THE INVENTION

The temperature device according to the invention comprises a temperature sensor designed to be inserted into a matter that is at least partly of water, such as food, so as to read its temperature.

Figure 1:
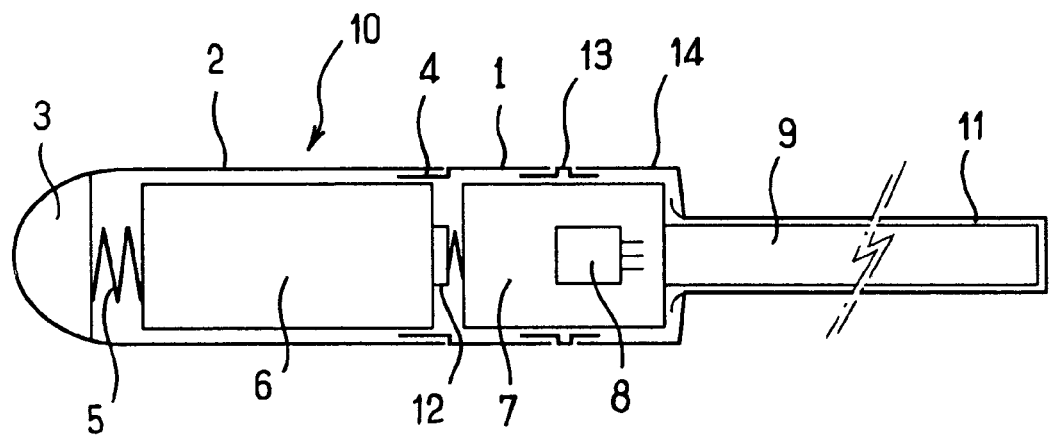
FIG. 1 represents a cross-section view of an initial temperature sensor according to the invention.

In reference to FIG. 1, an example of a wireless temperature sensor 10 is represented according to the invention comprising:

a temperature transducer 8, designed to read the temperature within matter that is at least partly of water;

an electric circuit 7 transmitting electromagnetic waves, electrically connected to the temperature transducer 8, comprising a converter of electric signals coming from the transducer 8 in the form of electromagnetic-type signals;

an electric power supply 6, electrically energising all of the electric elements of the sensor 10, and operating autonomously or practically autonomously;

a hermetic case designed to be fitted with the entire electrical system comprising a temperature transducer 8, the electric circuit 9 and the autonomous power supply 6.

This sensor is designed to resist extreme temperatures that food may be exposed to, whether that be during conservation in cold conditions or whilst being heated in an oven.

This sensor is in particular designed to resist temperatures ranging between approximately −40° C. and 130° C.

There exists different types of integrable temperature transducers 8 on the market, whose accuracy and operating temperature ranges comply with this invention.

An oscillating type temperature transducer 8 is preferable, mainly because this type of transducer offers little encumbrance and is sufficiently accurate.

For example, the "Dallas Semi-conducteur" company's range of temperature transducers includes several of such transducers, notably those with the references DS1620, DS1721, DS1820. Their range of calculated temperatures encompasses between −55° C. and 125° C., with tolerances of about ±0.5° C. They operate at a voltage lying between 2V and 6V. They comprise a non-volatile memory from which operating can be optimised. They send a digital electric signal.

The electric circuit 7 is advantageously an hertzian wave transmitter.

Different very simple transmitters with amplitude modulation, for example remote control models within the 433 MHz range, operate in a moderate temperature range, lying between approximately −25° C. and 80° C., a range which can be extended from −55° C. to more than 100° C. by adjusting the frequency settings.

For example, a "RF solution" or "Aurel" transmitter circuit can be used if the amplitude of the carrier is modified.

Within the context of the invention, the electric circuit 7 can however be a transmitter of other types of electromagnetic waves.

Optionally, the sensor 10 further comprises a transmitting/receiving aerial 9 of electromagnetic waves extending out of the sensor 10 in line with its axis and being connected directly to the converter of the electric circuit 7 so as to improve the quality of the electromagnetic exchanges with an external receiver.

Optionally, this aerial 9 is long enough and made of sufficiently rigid and solid material to also ensure the gripping function of the sensor 10, notably to assist its insertion into the matter to be thermal monitored.

Preferably the aerial 9 is covered with a high-temperature protection (such as the maximum temperatures convection or radiant ovens can attain, for example 300° C. or even 350° C.) so as to avoid the user of the sensor 10 being burnt when taking hold of the sensor via the aerial 9 to remove it from the hot matter.

This protection may consist of covering of the aerial with thermal insulating material of low thermal inertia.

This material can be, for example, a silicone foam that meets the requirements, this material offering at the same time a resistance to heat, a high thermal insulation rating and a low thermal inertia.

Optionally the aerial 9 is covered with an electrical insulator 11.

According to a particular configuration, this covering can be both an electrical insulator and a protection against the said burns, such as the said silicone cover.

The power supply 6 is advantageously an electric cell or a battery that may or may not be rechargeable.

The autonomous electric power supply 6 operates at a wide range of temperatures.

A non-saline and non-alkaline power supply 9 will thus be preferable.

For example, an electric cell of thionyl lithium technology operates within the said temperature ranges. The latter can even bear temperatures up to 180° C. without suffering any damage if they have not been charged up.

However, an electric cell of manganese lithium technology operates at a guaranteed working temperature from −30° C. to 75° C., and must therefore, if used in the sensor 10 according to the invention, be restricted to this temperature range.

The type of power supply 6 can be adapted to the desired usage of the sensor 10.

For example, the electric cell 6 can be changed if the temperature range changes, even though it is preferable within the context of the invention to use a single electric cell 6 that operates for all the required temperature ranges.

According to another configuration of the sensor 10, the power supply 6 is not located inside the sensor 10, but on the outside, by means of, for example, an electromagnetic type of energy source placed near to the sensor 10.

The hermetic case of the sensor 10 is designed to be fitted with the entire electrical system of the sensor 10.

As this case determines the volume of the sensor 10 (excluding the optional aerial 9), it is designed to house the electric elements (such as the transducer 8, the electric circuit 7 and the power supply 6) in a minimal space, thereby rendering the sensor 10 as compact as possible.

In particular, the temperature transducer 8 is located near to the electric circuit 7, contrary to the layout of temperature sensors according to extant technologies, as previously detailed in this document.

The internal elements of the sensor 10 represented in FIG. 1, are laid out in the case so that the power supply 6 is located near to the case head 3, in line with the circuit 7 closely connected with the transducer 8, the aerial 9 thus extending, at the end of sensor 10, lengthways out of the case.

This case also advantageously has an elongated form, resembling that of a capsule, with a case head 3 in a converging form so as to facilitate its insertion into the matter to be tested.

Optionally, the case head 3 is equipped with sharp elements, such as sharp dihedral or one or several blades so as to perforate the matter to be tested.

These sharp elements can be integral with the case head 3 forming, for example, a welded insert.

These sharp elements could be comprised in a metallic cap fitted to the head 3. In this case, the means used to fix the cap to the head 3 must be extremely solid so as to prevent the cap from being left behind in the monitored matter when the sensor 10 is retracted; these means of fixation can, for example, be screw threads machined in the cap and on the head 3.

The case is hermetic so that chemical species coming from the inside of the case can not escape, and that no solids, fluids or chemicals get into the sensor 10.

The case is made of thermal conductive material so as to precisely transmit to its interior environment the quantity of heat from the external environment (that of the matter to be monitored).

The case is advantageously made of electrical conductive material, for example a metallic material, such as aluminium.

The case can be made of a single-piece or several pieces assembled together.

The single-piece case has the advantage of being very hermetic.

The case made of several pieces allows it to be opened so as to replace a faulty element on the inside of the sensor 10, such as, for example, a power supply 6 that has been used up.

In reference to FIG. 1, the case is represented in two parts comprising a first body 1 and a second body 2 integral with the head 3, the two bodies 1 and 2 being linked in a detachable manner via a screw thread 4 or another means of seal-proof fixation.

In this example, the first body 1 contains the electric circuit 7 and the transducer 8 and the second body 2 contains the power supply 6.

According to an example of embodiment of an electric assembly of the sensor 10 not exclusive to the invention, the case is metallic and the earth of the power supply 6 is linked to the second metallic body 2 via a compression spring 5. The screw thread 4, as well as serving as a means of fixation of the two bodies 1 and 2, serves as an electric joint between the second metallic body 2 and the first metallic body 1.

The transmitter circuit 7 and the thermal transducer 8 are linked on one hand to the body 1 which serves as an earth, and on the other hand to the power supply 6 via a direct contact with a terminal 12.

Thus, this electric assembly allows the electric power supply of the components of the sensor 10 to be safely switched off, by simply detaching the sensor 10.

The thermal transducer 8 is capable of sending a modulating digital signal to the transmitter circuit 7 which is itself linked to the insulated aerial 9.

Thus, according to the invention, the entire system comprised of the casees 1, 2 and 3 and the matter (comprising water) to be monitored, of poor conductivity, constitutes an exposed conductive part acting as the earth for the transmitting aerial 9 protected by its insulator 11.

According to an alternative to the invention, an ergonomic means is implemented to restrict the transmission and reading of the temperature solely to the useful period, this corresponding to the insertion of the sensor 10 into the matter to be monitored.

This alternative to the invention is designed to preserve the power supply 6 and ensure a full lifespan.

This ergonomic means can be a conductive ring 14 insulated from the body 1 via an insulation sleeve 13.

In this alternative, the positive terminal of the power supply 6 is linked to the supply of a p-channel MOS transistor, and the conductive ring 14 is linked to the grid of this transistor, whereas the transmitter circuit 7 and the transducer 8 are linked to the drain.

With a high resistance value, for example 3 megohms, of the insulating sleeve 13, between the conductive ring 14 and the terminal of the power supply 6, the switching-off the supply circuit when the sensor 10 is outside the matter to be monitored is ensured.

The matter to be monitored being at least partly of water, it is of low conductivity and hence electrically stable.

Hence the slightly conductive matter to be monitored draws the transistor grid to the earth, thus setting off the conduction of the latter.

This therefore temporarily ensures the energising of the transmitter circuit 7 and of the transducer 8 whilst the sensor 10 is being inserted into the matter to be monitored, thus allowing energy to be consumed from the autonomous supply 6 solely when the sensor is inside the matter to be monitored.

Still with the purpose of reducing the consumption of the supply 6, a transmission by bursts of the electromagnetic waves containing thermal data will be preferable, so as to preserve the supply 6 between the bursts and thus increase its lifespan.

The sensor 10 according to the invention does not resist, just as the thermal sensors according to extant technologies, to high temperatures such as, for example 250° C. or 300° C., which are attained, for example, in radiant or convection ovens.

However, contrary to state of the art, the geometry of this sensor 10 (in reference to FIG. 1) is optimised to be completely inserted into the matter to be monitored, which is sufficiently large to contain it.

It is therefore not the heat of the oven that the sensor 10 is subjected to but the heat present inside the matter to be monitored.

Furthermore, as long as the matter contains sufficient water its temperature can not exceed 130° C.

By way of example, the majority of meat is cooked at 47 to 80° C., at its centre.

A genuine gratin Dauphinois (without the sacrilege of adding cheese), saturated in grease, represents one of the convenience foods the most likely to attain high temperatures (as it contains very little water, the grease can attain high temperatures and the cooking time of the potatoes is long) such as, for example, temperatures ranging between 120° C. and 130° C.

Thus according to the invention, all of the electronic elements of the autonomous sensor 10, kept at the centre of the food, and not on the surface, are not subject to external high temperatures, as these elements do not exceed the final cooking temperature of the food, thus ensuring normal usage of the sensor 10.

Hence such a sensor 10 allows the temperature of food to be monitored that is being subjected to extreme heat, something which was not possible with prior technologies.

Of course, if the food is too hot, the water will eventually completely evaporate, and too high a temperature will destroy the sensor 10 (however, in such an event, the gratin Dauphinois is also burnt black!). Means of temperature alarms so as to overcome such problems will be described later.

Moreover, due to the compactness and conductivity of the case of the sensor 10, all of its internal elements are at the same temperature, that of the monitored matter.

The sensor 10 being wireless it is not subject to safety or encumbrance difficulties as could be the case in the presence of electric wires in an oven.

Finally the sensor 10 is compact, thus reducing its encumbrance, notably when it is completely inserted into the food, with only the aerial 9 jutting out.

The description of the application of the sensor 10 to the monitoring of a cold chain is generally speaking similar to that of the sensor 10 to the monitoring of heat, except for the following points:

the operating temperature of the sensor is extended to approximately −40° C.;

the sensor 10 is not inserted into the food but is adjacent to it, the temperatures of the food, of the sensor 10 and of the casing being substantially equivalent;

the temperature of the refrigerated casing does not compromise to working order of the sensor, which resists in the long term;

the commutation system described above, which allows the sensor 10 to be supplied with electricity when it is inside the food, can therefore not operate in cold conditions; thus, the sensor continually transmits, via bursts, and the fastening of the case of the sensor 10 always renders the transmitter circuit 7 and the temperature transducer 8 live;

the silicone foam protects the user from skin bonding against the metallic aerial 9, thus allowing the sensor to be handled without any risks.

The sensor 10 also operates at intermediate temperatures, both hot and cold, such as room temperature.

Figure 2:
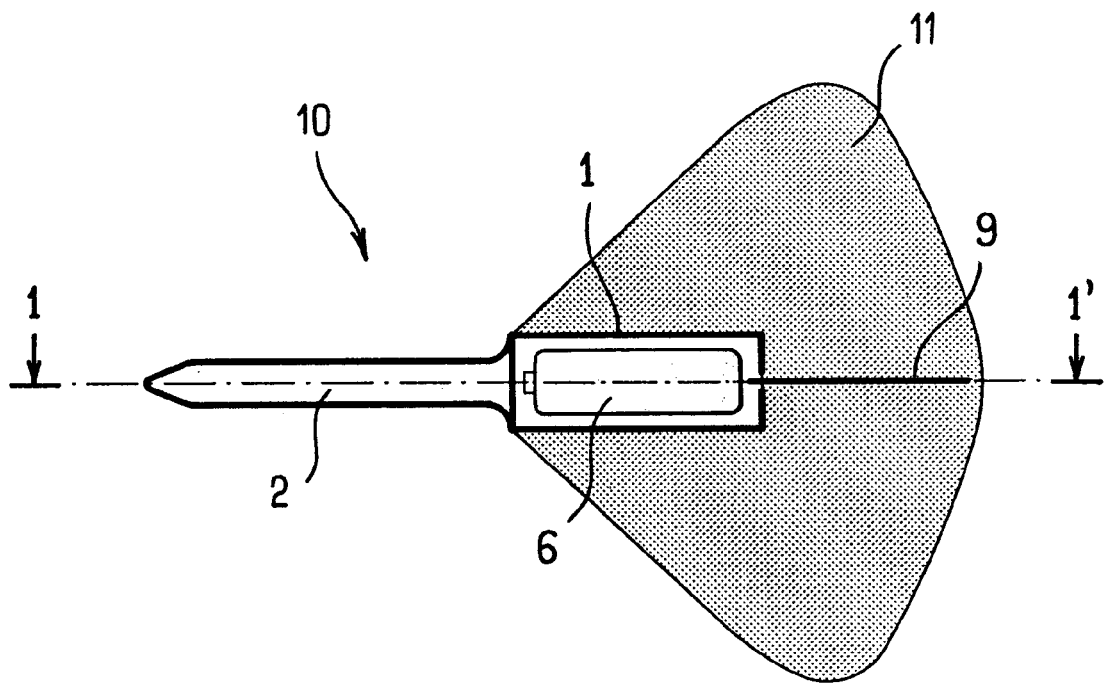
FIG. 2 represents an initial cross-section view of a second temperature sensor according to the invention.
Figure 3:
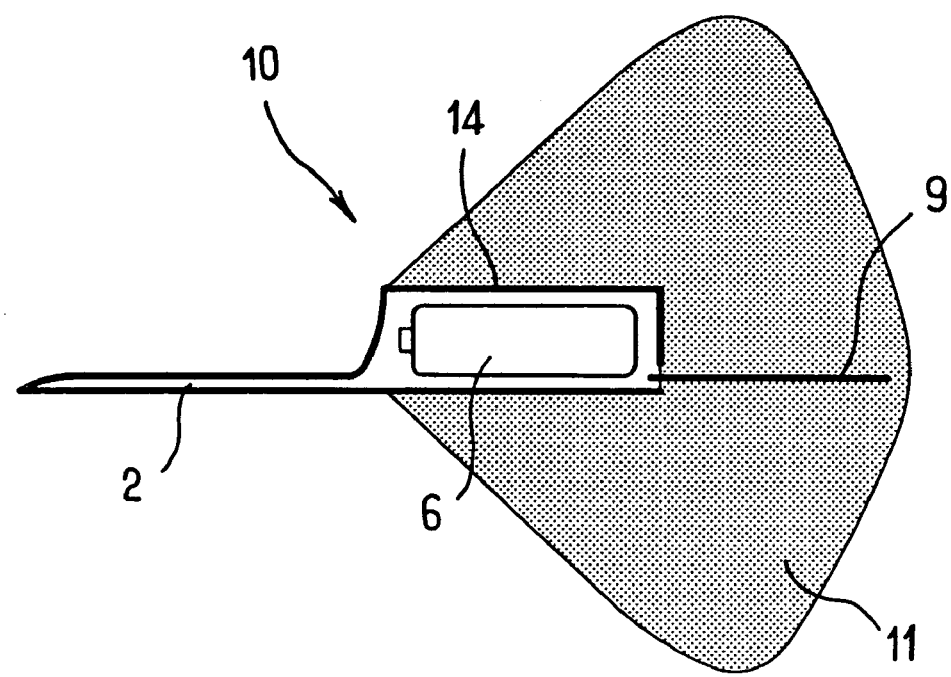
FIG. 3 represents a second cross-section view of the second sensor represented in FIG. 2 according to line 1–1'.

In reference to FIGS. 2 and 3, a second temperature sensor 10 according to the invention is represented.

This second sensor 10 is substantially comprised of the same elements as those described by the first sensor 10 (represented in FIG. 1).

The configuration of this second sensor 10 is however different, as the power supply 6 is now located to the end 1 of the sensor 10, and the unit consisting of the transducer 8 and the transmitter circuit 7 (not represented in FIGS. 2 and 3) is within the head 2 of the sensor 10.

The power supply 6 is therefore fitted between the transducer-transmitter circuit unit and the aerial 9.

Such a configuration of the sensor 10 is particularly well adapted when its usage consists of only inserting, the power supply 6 and the aerial 9 coming out of the food into the food, the head 2 of the sensor 10, and the usage planned for the first sensor 10 (referenced to in FIG. 1) when the power supply 6 was also inserted into the food.

This usage, if applied to high temperatures such as those present in convection and radiant ovens, requires a thermal protection of the power supply 6.

The type of protection chosen for the sensor 10 is that of a thermal shield 11 surrounding the end piece 1 of the sensor 10 (comprising the power supply 6) with thermal insulating material.

For example, this material is of silicone.

Advantageously, this thermal shield 11 further covers the aerial 9 so that both the power supply 6 and the aerial 9 are protected from heat via the same protection medium.

The thickness of the thermal shield 11 is then adjusted so that the temperature at the power supply 6 lies within its tolerance range.

As before, a thionyl lithium electric cell can be chosen as the power supply 6.

In reference to FIG. 3, a cross-section view shows a design of the head 2 of the sensor 10 so that the latter can be easily inserted into the food.

Here, the chosen design is quite narrow with sharp edges and point, comparable to the blade of a pointed knife.

Figure 4:
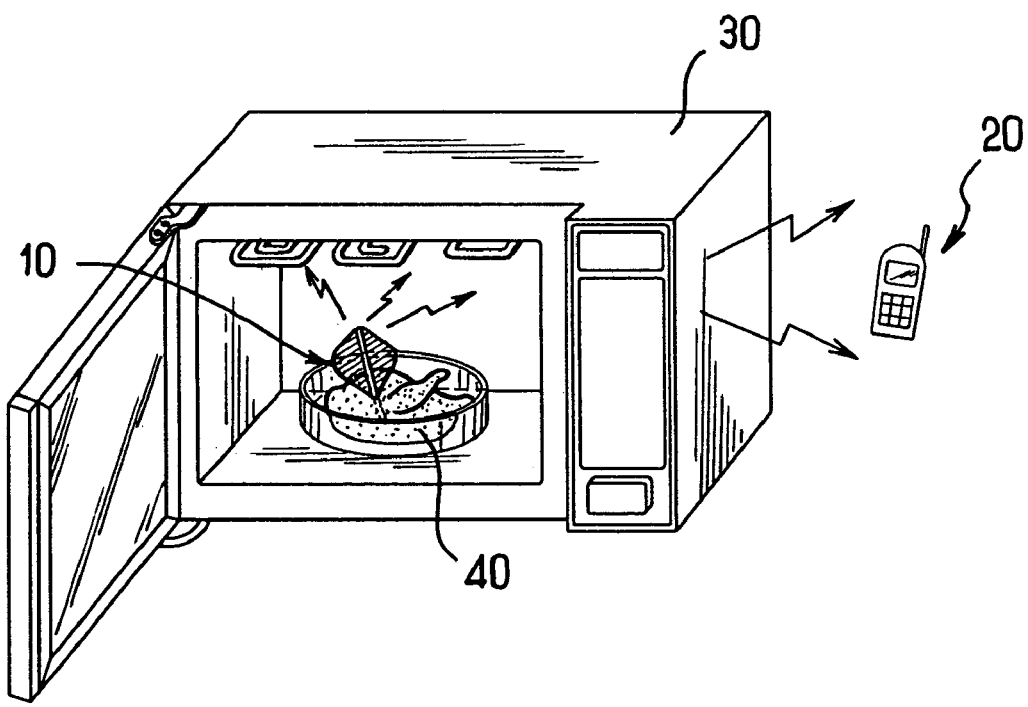
FIG. 4 is a diagram representation of a temperature monitoring device according to the invention applied to the example of cooking food.

In reference to FIG. 4, the example of an application of the illustrated invention is the monitoring of the cooking of food 40 (in this case a free-range chicken) in an oven 30, through the use of a temperature monitoring device on the inside of the food 40 according to the invention.

The monitoring device according to the invention that is represented comprises:
  a wireless temperature sensor 10 capable of reading thermal data; and
  a control unit 20 capable of handling this thermal data.

The temperature sensor 10, in compliance with the invention, is inserted into the food 40, using, for example, the aerial 9 as a means of gripping (see the above in this document).

If the sensor 10 corresponds to the first sensor 10 (in reference to FIG. 1), the entire sensor 10 excluding the aerial 9 can be inserted into the food.

If the sensor 10 corresponds to the second sensor 10 (in reference to FIGS. 2 and 3) the entire sensor 10 excluding the aerial 9 and the power supply 6, is inserted into the food.

As indicated above, according to a particular electric configuration of the sensor 10, the food 40, of low electric conductivity, touches the sensor 10 and switches on the autonomous electric operating of the sensor 10.

Bursts of electromagnetic signals are thus transmitted from the sensor 10, these signals comprising the thermal data captured in the food 40 by the transducer 8.

The control unit 20 then receives these electromagnetic signals so as to deliver at least some of the thermal data that they contain in a form likely to be understood by the user of the device.

For this purpose, the control unit 20 comprises a means of electromagnetic wave reception (such as an aerial), an electric circuit with amplitude or frequency modulation, a micro-controller, a user interface comprising means for transmitting thermal data in a form understandable to the user.

The means for receiving the electromagnetic waves receives the electromagnetic signals transmitted by the sensor 10, and transmits them to the modulation electric circuit.

The modulation electric circuit then converts the electromagnetic signals into electric or digital signals and transmits them to the micro-controller.

Then, the micro-controller converts these digital signals into interfacing signals capable of activating (or not activating) the user interface, these signals being then transmitted to the user interface which lastly delivers the thermal data to the user in a form understandable to the user.

This control unit 20 can, for example, comprise one or several of the following user interface media: a screen, such as a LCD; one or several light emitting diodes; an acoustic diaphragm.

The control unit 20 can further comprise an interactive user interface medium allowing the user to communicate signals via the control unit 20, such as a keyboard, mouse or infrared port of Bluetooth type.

Advantageously, this control unit 20 further comprises a memory that allows thermal data and possibly algorithms to be put to memory, which can be deleted, modified or programmed by the user via an interactive interface medium.

In this case, the micro-controller can compare the measured thermal data with the thermal data stored in the memory to handle the outgoing signal to the user interface.

The user can, for example, program via a programming keyboard, the cooking temperature of the free-range chicken, the data then being stored in the memory of the control unit 20 as a temperature threshold temperature (at which the free-range chicken is cooked to a perfection).

The micro-controller that receives the calculated thermal data will compare it with this temperature threshold, and then sends, when the calculated temperature is equal to or in excess of the temperature threshold, a signal to an appropriate interface which will alert the user via an alarm (sound or light).

At the same time, the micro-controller can transmit the thermal data to a LCD screen so that the latter displays the calculated temperatures.

Thus, according to the invention, other types of alarm can be envisaged such as, for example:
  an activating of the control unit 20 prior to the sensor 10 being inserted into the food triggers an alarm;
  a disappearing of the electromagnetic link after a pre-set time period or the absence of a pre-set number of bursts triggers an alarm;
  the draining of the autonomous power supply 6 of the sensor 10 triggers an alarm as it interrupts the transmission;
  the recording of a temperature that is out with the authorised limits for the efficient operating of the sensor 10 triggers the recording to the memory of the monitoring case and a message appears on the display of the latter.

The second example allows in particular the monitoring device to be made more reliable, and in particular the sensor 10, as an alarm is triggered when the sensor 10 operates abnormally.

This is ensured, for example, in that any breakage in the link for more than three bursts triggers the alarm.

In the fourth example, the user is alerted of the risk of a consecutive incident due to a monitoring fault and a reactive deficiency of the alarm (and the manufacturer can, thus be held harmless to a faulty reaction of the user's alarm).

The invention claimed is:

1. Wireless temperature sensor for sensing the temperature of a matter that is at least partly of water, including food, comprising:
   a temperature transducer of said matter;
   an electromagnetic wave transmitter circuit electrically connected to the temperature transducer, comprising a converter of electric signals coming from the transducer to electromagnetic type signals;
   a hermetic and thermal conductive case designed to be fitted with the electric system comprising the temperature transducer and the transmitter circuit;
   wherein the sensor is laid out so that the temperature transducer is located near to the transmitter circuit, thereby forming a compact unit to be completely inserted into said matter so that it can be only subjected to the heat present inside the matter; wherein the sensor further comprises an autonomous non-saline and non-alkaline electric cell, placed inside the case, for supplying electric power to the whole sensor.

2. Sensor according to claim 1, wherein the electric cell is near to the transducer and the transmitter circuit, thereby forming a compact unit.

3. Sensor according to claim 2, wherein the electric cell is distant from the transmitter and the transducer so that it remains outside the matter when the sensor is inserted into the matter.

4. Sensor according to claim 3, wherein the electric cell is protected against heat by a thermal insulating cover, thus forming a thermal shield.

5. Sensor according to claim 4, wherein the cover is of silicone.

6. Sensor according to claim 1, claim 2, claim 3, claim 4 or claim 5, wherein said autonomous electric cell can operate up to temperatures of about 130° C. (266° F.).

7. Sensor according to claim 1, claim 2, claim 3, claim 4 or claim 5, wherein the autonomous electric cell can operate from temperatures of about −40° C.

8. Sensor according to claim 1, claim 2, claim 3, claim 4 or claim 5, wherein said autonomous electric cell is a thionyl lithium electric cell.

9. Sensor according to claim 1, claim 2, claim 3, claim 4 or claim 5, wherein the case is electrically conductive, and wherein the sensor further comprises means for switching-off electric power supplied by the power supply source when the sensor is not in contact with said matter, the power supply switch-off means being sensitive to the conductivity of said matter.

10. Sensor according to claim 1, claim 2, claim 3, claim 4 or claim 5, wherein the transmitter circuit transmits the electromagnetic waves by bursts.

11. Sensor according to claim 1, claim 2, claim 3, claim 4 or claim 5, wherein the hermetic case is of a single piece.

12. Sensor according to claim 1, claim 2, claim 3, claim 4 or claim 5, wherein the case is made of several fitted pieces that can be disassembled.

13. Sensor according to claim 12, wherein assembly means for assembling of two pieces of the hermetic case are metallic and create an electric contact for the operating of the sensor.

14. Sensor according to claim 1, claim 2, claim 3, claim 4 or claim 5, wherein the case is laid out so as to facilitate the insertion of the sensor into said matter.

15. Sensor according to claim 1, claim 2, claim 3, claim 4 or claim 5, wherein the sensor further comprises an electromagnetic wave transmitting aerial laid out so as to further constitute means of gripping.

16. Sensor according to claim 15, wherein the aerial has an electrical insulating cover.

17. Sensor according to claim 16, wherein the electrical insulating cover is a silicone foam.

18. Temperature monitoring device of a matter that is at least partly of water, including food, intended to be placed in an oven comprising:
   a wireless temperature sensor comprising:
   a temperature transducer of said matter;
   an electromagnetic wave transmitter circuit electrically connected to the temperature transducer, comprising a converter of electric signals coming from the transducer to electromagnetic type signals;
   a hermetic and thermal conductive case designed to be fitted with all of the electric system comprising the temperature transducer and the transmitter circuit;
   wherein the sensor is laid out so that the temperature transducer is located near the transmitter circuit, thereby forming a compact unit to be completely inserted into said matter so that it can be only subjected to the heat present inside the matter; and
   a control unit autonomous and independent from the oven behaviour, and controlling the thermal data transmitted from the sensor by electromagnetic waves, said control unit comprising:
   a receiver for the type of electromagnetic waves transmitted by the sensor;
   a micro-controller capable of controlling the thermal data in electromagnetic form received from the sensor by the receiver, and of transmitting at least a part of it to a user interface;
   the user interface comprising transmission means of the thermal data in a form understandable to the user of the device.

19. Device according to claim 18, wherein the control unit further comprises a memory capable of storing thermal data and wherein the micro-controller is capable of processing the thermal data received from the sensor in accordance with this thermal data.

20. Device according to claim 19, wherein the user interface comprises an alarm, wherein thermal data stored in the memory corresponds to a temperature threshold, and in that the micro-controller triggers the alarm if the temperature detected by the sensor is greater than the temperature threshold.

21. Device according to claim 19 or claim 20, wherein the user interface comprises means that allow the user to input the data into the memory.

22. Device according to claim 18, claim 19 or claim 20, wherein the user interface comprises an alarm, and wherein the micro-controller triggers the alarm if it does not receive any electromagnetic waves over a pre-set duration or if it does not receive at least one thermal informations that it should have received.

23. Temperature monitoring process for a matter that is at least partly of water, including food, the matter having a temperature less than approximately 130° C. (266° F.), activating the temperature monitoring device according to claim 18, claim 19 or claim 20, wherein the wireless part of the temperature sensor comprising the transducer and the transmitter circuit is inserted into said matter.

24. Temperature monitoring process according to claim 23, wherein the part of the sensor comprising the power supply is also inserted into said matter.

* * * * *